(12) United States Patent
Xu (10) Patent No.: US 7,529,062 B2
(45) Date of Patent: May 5, 2009

(54) FORMED IN PLACE VIBRATION DAMPER OR DAMPERS

(75) Inventor: Mo Xu, Singapore (SG)

(73) Assignee: Seagate Technology LLC, Scotts Valley, CA (US)

(*) Notice: Subject to any disclaimer, the term of this patent is extended or adjusted under 35 U.S.C. 154(b) by 448 days.

(21) Appl. No.: 11/110,298

(22) Filed: Apr. 20, 2005

(65) Prior Publication Data

US 2006/0238914 A1 Oct. 26, 2006

(51) Int. Cl.
G11B 33/14 (2006.01)
(52) U.S. Cl. .................................. 360/97.02
(58) Field of Classification Search ............... 360/97.02
See application file for complete search history.

(56) References Cited

U.S. PATENT DOCUMENTS

| | | | | |
|---|---|---|---|---|
| 4,587,645 A | 5/1986 | Wong | ............ | 369/75.1 |
| 4,888,655 A | 12/1989 | Bonn | ............ | 360/97.03 |
| 5,034,835 A | 7/1991 | Yokoyama | ............ | 360/79.02 |
| 5,326,611 A | 7/1994 | Kishita | ............ | 428/78 |
| 5,517,375 A | 5/1996 | Dion et al. | ............ | 360/97.07 |
| 5,696,649 A | 12/1997 | Boutaghou | ............ | 360/97.03 |
| 5,781,373 A | 7/1998 | Larson et al. | ............ | 360/97.02 |
| 5,825,585 A * | 10/1998 | Hatam-Tabrizi | ............ | 360/97.02 |
| 6,005,768 A | 12/1999 | Jo | ............ | 361/685 |
| 6,008,965 A | 12/1999 | Izumi et al. | ............ | 360/97.03 |
| 6,081,406 A | 6/2000 | Morris et al. | ............ | 360/97.01 |
| 6,097,568 A | 8/2000 | Ekhoff | ............ | 360/97.02 |
| 6,097,608 A | 8/2000 | Berberich et al. | ............ | 361/752 |
| 6,104,571 A | 8/2000 | Kabasawa | ............ | 360/236.4 |
| 6,121,703 A | 9/2000 | Kloeppel et al. | ............ | 310/90 |
| 6,175,469 B1 | 1/2001 | Ahmad et al. | ............ | 360/97.02 |
| 6,208,484 B1 | 3/2001 | Voights | ............ | 360/97.02 |
| 6,249,824 B1 | 6/2001 | Henrichs | ............ | 710/8 |
| 6,256,165 B1 | 7/2001 | Kim | ............ | 360/97.01 |
| 6,266,208 B1 | 7/2001 | Voights | ............ | 360/97.01 |
| 6,296,691 B1 | 10/2001 | Gidumal | ............ | 96/17 |
| 6,337,782 B1 | 1/2002 | Guerin | ............ | 360/256.1 |
| 6,360,843 B1 | 3/2002 | Kim et al. | ............ | 181/207 |
| 6,377,420 B1 | 4/2002 | Tadepalli et al. | ............ | 360/97.02 |
| 6,501,615 B1 * | 12/2002 | Kelsic et al. | ............ | 360/97.02 |
| 6,549,365 B1 | 4/2003 | Severson | ............ | 360/97.02 |
| 6,603,633 B2 | 8/2003 | Heaton et al. | ............ | 360/97.02 |
| 6,608,732 B2 * | 8/2003 | Bernett et al. | ............ | 360/97.02 |
| 6,636,379 B2 | 10/2003 | Rannow et al. | ............ | 360/97.02 |
| 6,646,826 B1 | 11/2003 | Haidari et al. | ............ | 360/97.02 |
| 6,724,566 B2 | 4/2004 | Kant et al. | ............ | 360/97.01 |

(Continued)

OTHER PUBLICATIONS

"Form-in-Place Gasket", 3M product specification, Jun. 2003.

*Primary Examiner*—A. J. Heinz
(74) *Attorney, Agent, or Firm*—Westman, Champlin & Kelly, P.A.

(57) ABSTRACT

A formed in place damper for a data storage device. The damper is formed of an elastomeric bead which is cured to a cover or component to form a damper body having contoured shape or surface formed by an outer surface of the cured elastomeric bead. The damper is formed in place to a cover of the data storage device so that when the cover is assembled to a base, the damper is interposed between the cover or housing and a disc spindle assembly, actuator or voice coil motor. Alternatively the damper is formed to drive components, such as the disc spindle assembly, actuator or voice coil motor.

26 Claims, 9 Drawing Sheets

U.S. PATENT DOCUMENTS

| | | | |
|---|---|---|---|
| 6,850,387 B2 | 2/2005 | Daniel | 360/97.01 |
| 6,894,867 B2 | 5/2005 | Hong et al. | 360/97.02 |
| 2002/0093757 A1 | 7/2002 | Daniel | 360/97.01 |
| 2003/0058572 A1* | 3/2003 | Kant et al. | 360/97.01 |
| 2003/0086208 A1 | 5/2003 | Hong et al. | 360/256.1 |
| 2003/0128461 A1* | 7/2003 | Hirasaka et al. | 360/97.01 |
| 2003/0147175 A1 | 8/2003 | Tadepalli et al. | 360/97.02 |
| 2003/0156350 A1 | 8/2003 | Hong et al. | 360/97.02 |
| 2003/0197974 A1 | 10/2003 | Hong et al. | 360/97.02 |
| 2003/0202275 A1 | 10/2003 | Adams | 360/97.02 |
| 2003/0202276 A1 | 10/2003 | Smith | 360/97.02 |
| 2003/0210500 A1 | 11/2003 | Hong et al. | 360/256.1 |
| 2003/0218828 A1 | 11/2003 | Hong et al. | 360/97.02 |
| 2003/0218829 A1 | 11/2003 | Hong et al. | 360/97.02 |
| 2003/0231424 A1 | 12/2003 | Hong et al. | 360/97.02 |
| 2004/0012881 A1 | 1/2004 | Hong et al. | 360/97.02 |
| 2004/0084246 A1 | 5/2004 | Xu | 181/202 |
| 2005/0024763 A1 | 2/2005 | Ng et al. | 360/97.02 |
| 2005/0063092 A1 | 3/2005 | Xu et al. | 360/97.02 |
| 2005/0094313 A1 | 5/2005 | Kim | 360/97.02 |
| 2005/0099734 A1* | 5/2005 | Rafaelof | 360/264.8 |
| 2005/0185325 A1 | 8/2005 | Hur | 360/97.02 |

* cited by examiner

FORMED IN PLACE VIBRATION DAMPER OR DAMPERS

FIELD OF THE INVENTION

The present invention relates generally to a formed in place vibration damper or dampers, and more particularly but not by limitation to, a formed in place vibration damper for components of a data storage device.

BACKGROUND OF THE INVENTION

Data storage devices store digital information on discs or other encodable media. Heads read data from or write data to the discs or encodable media. Heads are coupled to an actuator that is rotated or moved to position the heads relative to the discs or media supported on a spindle assembly. The actuator are moved or rotated via a voice coil motor. The actuator and spindle assembly or motor are supported relative to a base of the data storage device. A cover is secured to the base to form a housing and an inner compartment of the data storage device.

Typically the actuator and spindle assembly or motor are secured or fixed to the cover via a screw or fastener. The connection of the actuator and disc spindle assembly to the cover can transmit vibration between the actuator and disc spindle assembly and cover. Vibration transmission between the cover or housing and the spindle assembly, actuator or other drive components can increase acoustic noise or interfere with read/write operations or head placement. Use of spring washers or similar dampers to limit vibration transmission increases fabrication complexity and cost of the data storage device. Embodiments of the present invention provide solutions to these and other problems, and offer other advantages over the prior art.

SUMMARY OF THE INVENTION

The present invention relates to a formed in place damper for a data storage device. The damper is formed of a cured elastomeric bead which is deposited to a cover or other component of the data storage device. The elastomeric bead is cured to form a damper body having a surface contour formed by an outer surface of the cured elastomeric bead. The damper is formed in place to a cover of the data storage device so that when the cover is assembled to the base of the data storage device, the damper is interposed between the cover or housing and the disc spindle assembly, actuator or other drive components.

The damper can be fabricated to the cover in conjunction with a seal or gasket about an outer perimeter of the cover. In other embodiments disclosed, the damper is formed "in place" to drive components, such as the spindle motor, actuator, voice coil motor or base. Fabrication of the damper in place simplifies fabrication complexity and reduces overall expense. Other features and benefits that characterize embodiments of the present invention will be apparent upon reading the following detailed description and review of the associated drawings.

BRIEF DESCRIPTION OF THE DRAWINGS

FIGS. 3-A to 3-C illustrate embodiments of an elastomeric damper for a spindle assembly for a data storage device.

FIGS. 4-A to 4-B illustrate embodiments of an elastomeric damper for an actuator for a data storage device.

DETAILED DESCRIPTION OF ILLUSTRATIVE EMBODIMENTS

Figure 1:
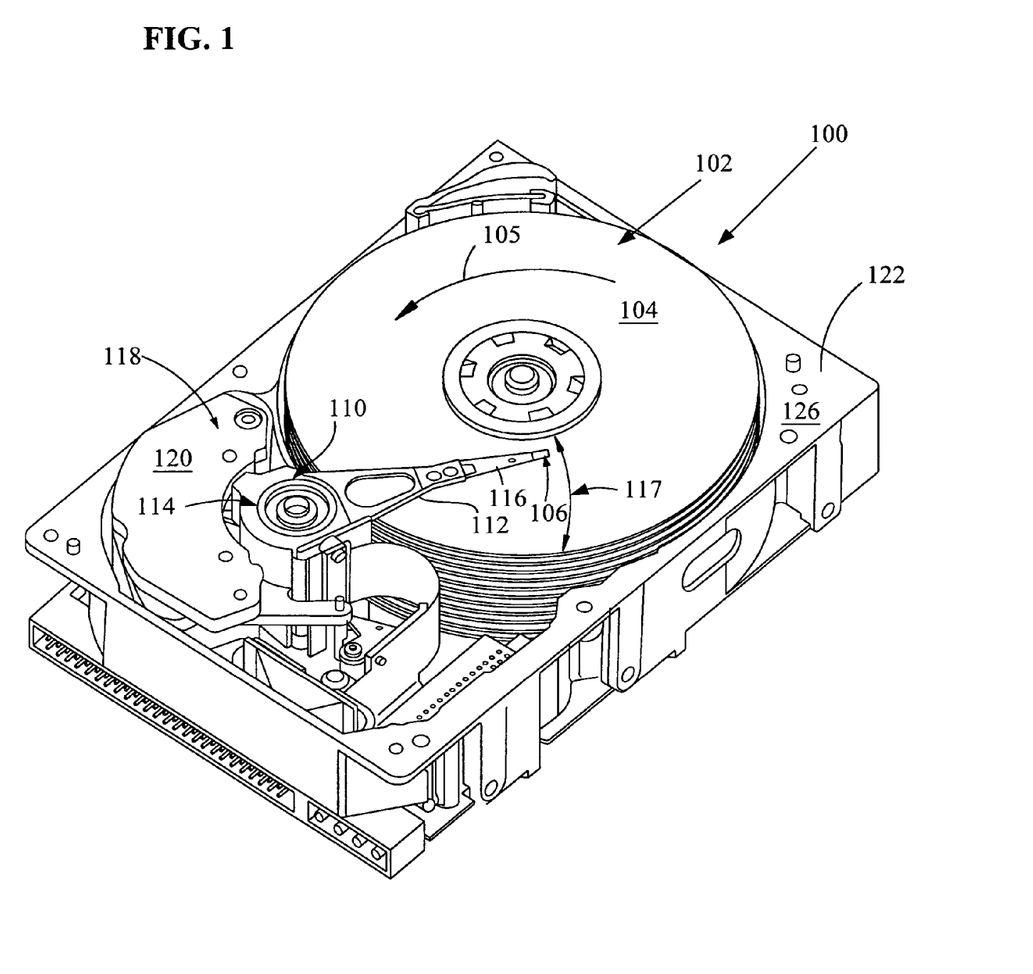
FIG. 1 is an exploded view of an embodiment of a data storage device in which the present invention is used.

FIG. 1 illustrates an embodiment of a data storage device 100 in which the present invention has application. The data storage device 100 includes a disc spindle assembly 102 which includes a plurality of discs 104 rotated as illustrated by arrow 105 via a spindle motor (not shown). Heads 106 are coupled to an actuator 110 which moves the heads 106 relative to the discs 104 to read data from or write data to the plurality of discs 104 through an interface with a host computer. The heads 106 are coupled to arms 112 of an actuator block 114 through a suspension 116 (only one shown in FIG. 1). The actuator 110 rotates to move the heads 106 as illustrated by arrow 117 relative to the discs via operation of a voice coil motor 118. As shown, the actuator 110, disc spindle assembly 102 and a magnet assembly 120 of the voice coil are coupled to a base 122 of the data storage device. Although in the data storage device of FIG. 1, the spindle assembly includes a plurality of discs, application is not so limited and the present invention has application for a data storage device having a single disc.

Figure 2:
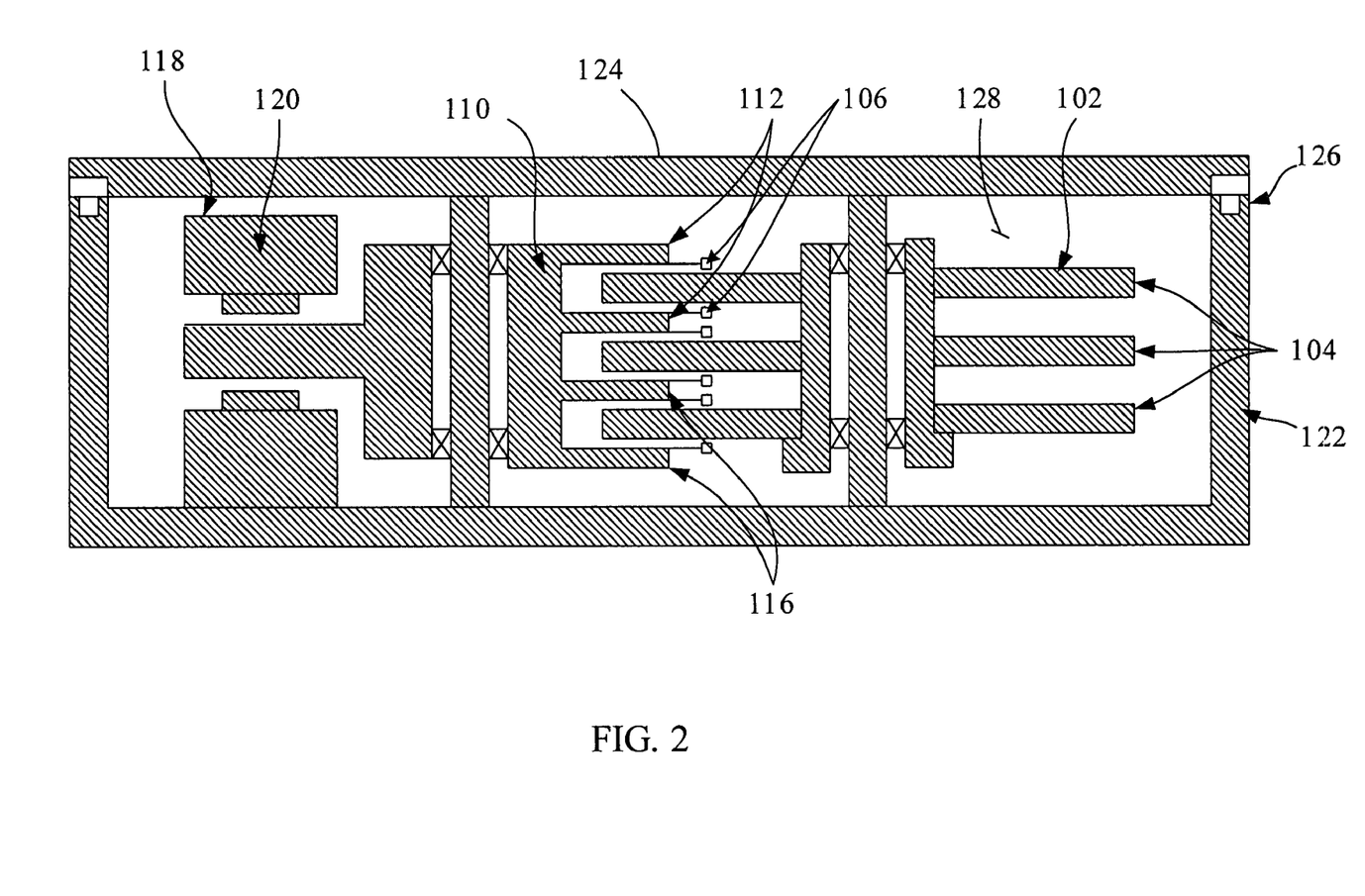
FIG. 2 is a cross-sectional view of an embodiment of a data storage device.

As shown in FIG. 2, a cover 124 is secured to a perimeter or raised deck 126 of the base 122 to form a housing and an inner compartment 128 for the device components. Operation or rotation of disc spindle assembly 102 and actuator 110 can excite vibration modes of the disc spindle assembly 102 and actuator 110. The actuator 110 and disc spindle assembly 102 are typically secured or fixed to the cover via a screw or fastener (not shown). Connection of the actuator 110 and disc spindle assembly 102 to the cover can transmit vibration between the actuator 110 or disc spindle assembly 102 and the cover 124. Vibration transmission between the cover 124 and disc spindle assembly 102, actuator 110 or other drive components can increase acoustic noise or interfere with read/write operations or head placement.

Figure 3:
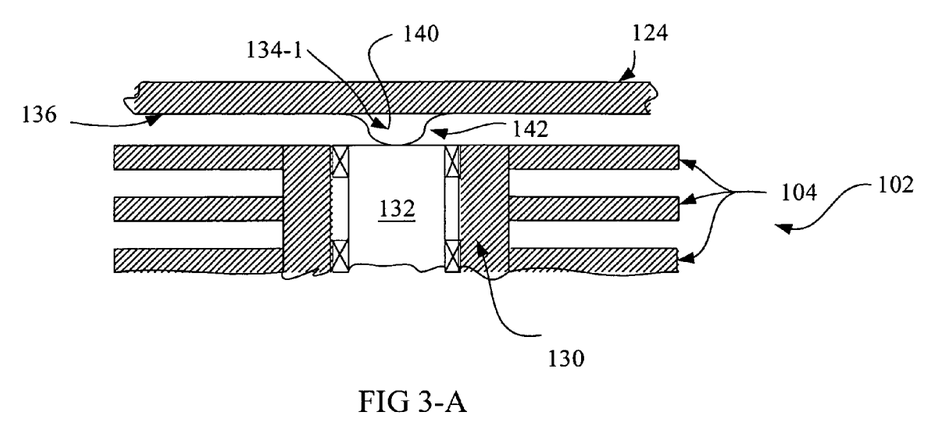

In an illustrated embodiment shown in FIG. 3-A, the disc spindle assembly 102 includes sleeve 130 rotatable about a fixed or stationary shaft 132 and a spindle motor (not shown). Energization of the spindle motor (not shown) rotates sleeve 130 relative to the fixed or stationary shaft 132, as is known in the art. Discs are supported on the rotating sleeve 130 and the stationary shaft 132 is secured relative to the cover or housing. Sleeve 130 is rotationally coupled to the stationary shaft 132 though a bearing assembly illustrated diagrammatically. In the illustrated embodiment, an elastomeric damper 134-1 is interposed in the vibration path between the disc spindle assembly 102 and the cover 124. When the cover 124 is secured to the base 122, the elastomeric damper 134-1 holds the fixed shaft 132 relative to the housing to provide a screwless interface as will be described. The damper 134-1 also limits vibration transmission between the cover and the disc spindle assembly 102.

In one embodiment shown in FIG. 3-B, the elastomeric damper 134-1 is formed in place to an inner surface 136 of the cover 124. The elastomeric damper 134-1 is formed by depositing an elastomeric bead to a cover plate and curing the elastomeric bead to form a damper body 140 having a body contour or surface 142 formed by an outer surface of the cured elastomeric bead. In an alternate embodiment the damper 134-1 is formed to the stationary shaft 132 of the spindle assembly as shown in FIG. 3-C. The damper 134-1 as described is formed in place by depositing and curing the elastomeric bead to the cover plate of cover 124 or disc spindle assembly eliminating the need for expensive parts and assembly.

In one embodiment, the elastomeric bead is formed of a two-part epoxy elastomeric material such as 3M Form-in-Place Gasket 7001 B/A material available from Minnesota, Mining & Manufacturing Co. of St. Paul, Minn. The two part elastomeric material includes an epoxy or base material and a curative or accelerator material. The deposited bead is thermally cured to form the elastomeric damper. The bead is thermally cured by placing the cover or deposited bead in an oven at an elevated temperature for a curing period.

Figure 4:
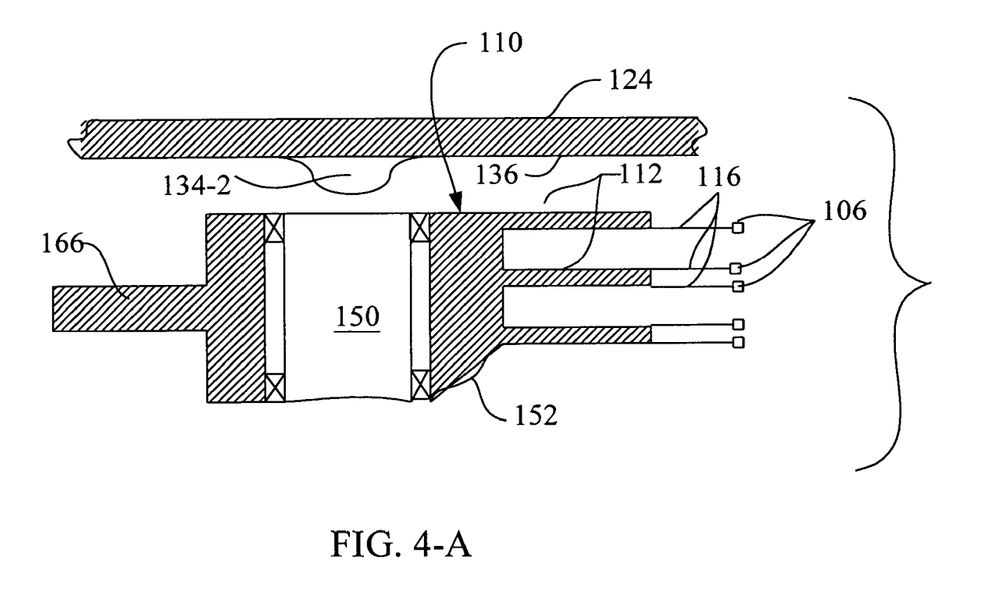

FIGS. 4-A and 4-B illustrate an elastomeric damper 134-2 to limit vibration transmission between the cover or housing and the actuator 110 of a data storage device. In the embodiment illustrated in FIG. 4-A, the elastomeric damper 134-2 is formed to the cover 124 so that when the cover 124 is assembled to the base, the damper 134-2 engages a stationary or fixed shaft or portion 150 of the actuator having an actuator portion 152 and arms 112 rotatable relative thereto. Heads 106 are coupled to arms 112 via suspensions 116. Although FIG. 4-A illustrates a plurality of arms, application is not limited to a plurality or particular number of arms or heads. The actuator portion 152 is rotationally coupled to the fixed shaft or portion 150 through a bearing assembly illustrated diagrammatically. Alternatively as shown in FIG. 4-B, the elastomeric damper 134-2 is formed to the stationary portion or shaft 150 of the actuator 110.

Figure 5:
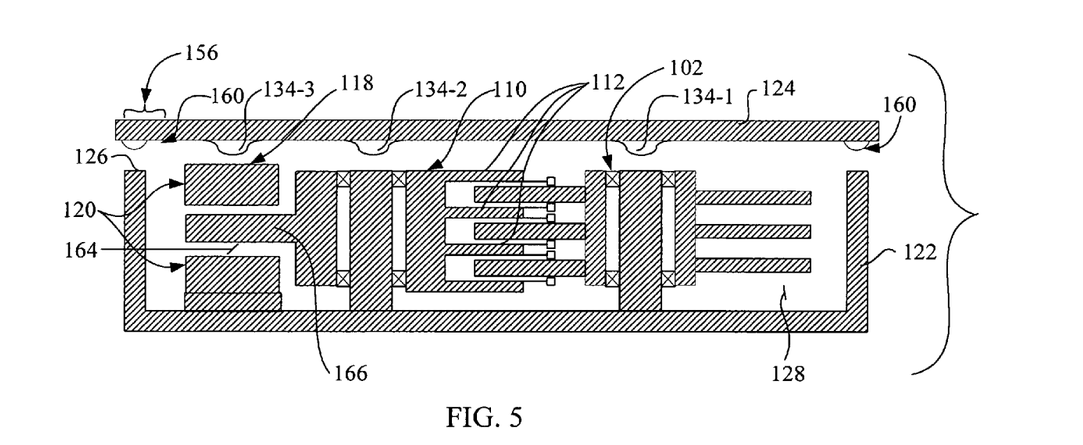
FIG. 5 is a schematic illustration of an embodiment of a data storage device including elastomeric dampers fabricated on a cover which is shown exploded from the base.

FIG. 5 illustrates an embodiment of a data storage device which employs multiple elastomeric dampers 134-1, 134-2, 134-3 between the cover 124 or housing and drive components to limit vibration transmission. In the illustrated embodiment, the elastomeric dampers 134-1, 134-2, 134-3 are formed to the cover plate prior to assembly of the cover 124 to the base 122. As shown, dampers 134-1, 134-2 for the disc spindle assembly and actuator are formed by depositing a curable elastomeric bead to an interior portion of the cover 124 proximate to the interface with the spindle assembly 102 or actuator 110. The cover 124 is secured to the base 122 at the perimeter portion of the cover and base. When assembled the cover 124 compresses the dampers 134-1, 134-2 to provide a friction interface or screw-less interface between the housing or cover and the disc spindle assembly 102 and actuator 110.

As shown, the elastomeric beads for the dampers is deposited on an inner or interior portion of the cover 124 spaced from a perimeter portion 156 which is connected to the base 122 to form the inner compartment 128. In the illustrated embodiment, an elastomeric bead is also deposited about or along the perimeter portion 156 of the cover 124 or alternately a perimeter portion of the base 122 where the cover 124 is secured to the base 122. The bead is cured to form an elastomeric seal 160 about a perimeter of the device or compartment 128.

As previously described, the actuator 110 is rotated or moved by a voice coil motor 118. The voice coil motor 118 includes magnet or backiron assemblies 120 which are spaced to form a magnetic flux gap 164 as shown in FIG. 5. A voice coil 166 coupled to the actuator 110 is supported in the gap 164. The voice coil 166 is energized to rotate the actuator 110 to position the heads 106 for read and/or write operations as previously described. Magnet assemblies 120 include a magnet and backiron and are typically supported in spaced relation via posts (not shown) to form gap 164.

To reduce vibration transmission, an elastomeric damper 134-3 can be formed in place to the magnet or backiron assemblies 120, cover 124 or base 122 so that when the voice coil motor 118 is assembled in the data storage device, the damper 134-3 is disposed between the voice coil motor 118 and cover 124 or the base 122 to limit vibration transmission between the voice coil motor 118 and the cover and/or base. In the illustrated embodiment, the elastomeric damper 134-3 is formed to the cover plate so that when the cover 124 is assembled to the base 122 a protruding surface of the damper 134-3 interfaces with the voice coil motor 118 to reduce vibration transmission.

Thus as described with respect to FIG. 5, multiple elastomeric beads can be deposited and cured to form dampers as well as a perimeter seal 160 between the cover 124 and the base 122. Fabrication of dampers directly to the cover 124 allows for fabrication of one or multiple dampers and seal using a single curing process to reduce fabrication time and expense.

Figure 6:
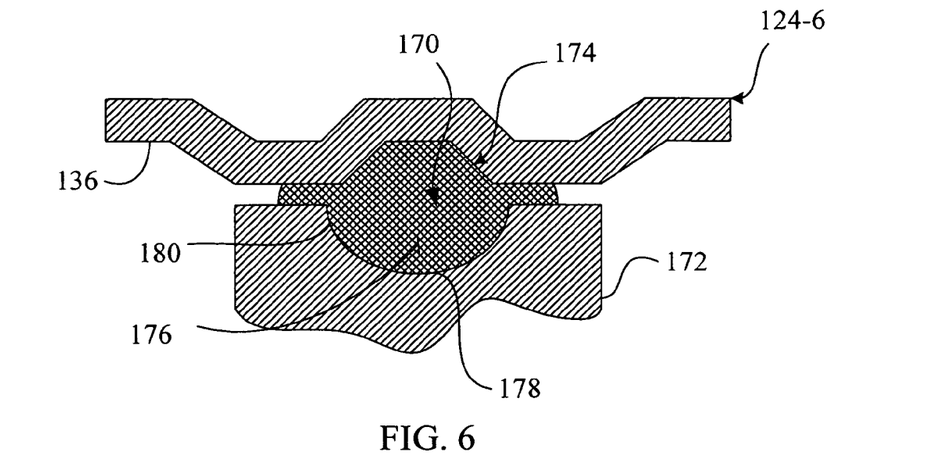
FIGS. 6-8 schematically illustrate embodiments of an elastomeric damper formed in place to a cover for a data storage device.
Figure 7:
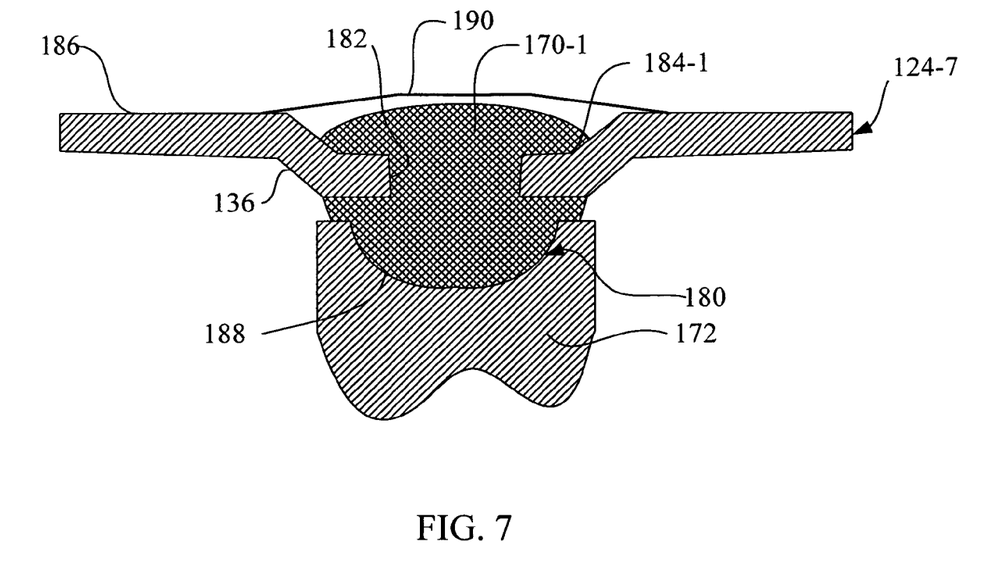
Figure 8:
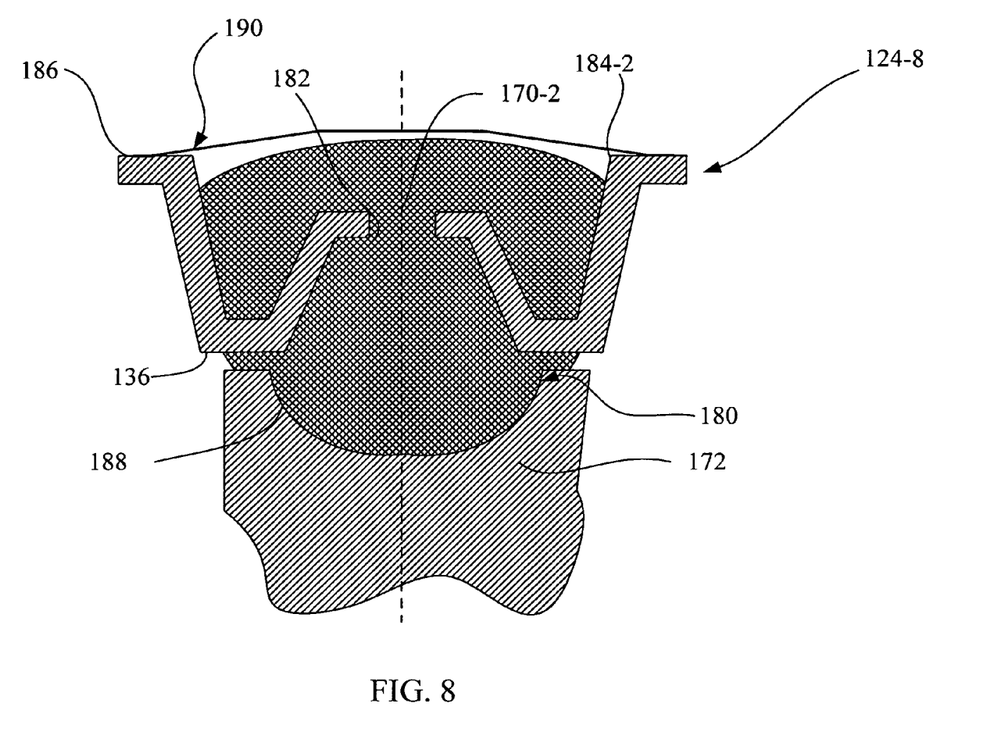

FIGS. 6-8 illustrate embodiments of an elastomeric damper 170, 170-1, 170-2 formed to the covers 124-6, 124-7, 124-8 to interface with a fixed or stationary shaft 172 for example a fixed or stationary shaft or portion of the spindle assembly 102 or actuator 110. As shown, in FIG. 6, the elastomeric damper 170 is formed relative to a socket 174 having a raised elevation relative to an inner surface 136 of the cover plate. The elastomeric bead is deposited into the socket 174 and is cured to form a protruding damper body 176 having a bulbous body shape and rounded surface 178 spaced from the cover plate to interface with a concave surface 180 on the stationary shaft or portion 172 to limit movement and vibration of the stationary shaft or portion. The damper body 176 is disposed in the concave surface 180 of the shaft or stationary portion 172. The concave surface 180 increases the surface area and engagement between the stationary shaft portion 172 and the damper 170. The concave or rounded interface increases stiffness of the shaft 172 since the protruding damper body 176 is disposed within the concave surface 180.

In other embodiments illustrated in FIGS. 7-8, the dampers 170-1 and 170-2 include an elastomeric body which is formed through an opening 182 of the covers 124-7, 124-8 to form a seal for the opening 182. The elastomeric body is formed in a recessed socket 184-1, 184-2 on an outer surface 186 of the cover 124-7, 124-8, respectively. The elastomeric dampers 170-1, 170-2 extend from the socket 184-1, 184-2, respectively through the opening 182 to protrude from the inner surface 136 of the cover to interface with a fixed or stationary shaft 172 or other components as previously described. In the illustrated embodiment, the damper body similarly includes a bulbous shaped portion forming a rounded surface or contour 188 spaced from the inner surface 136 of the cover 124 to interface with a contoured or concave surface 180 on the stationary shaft or portion 172.

The embodiments illustrated in FIGS. 7-8 provide a damper and seal which can be used with cover designs which include an opening positioned proximate to the stationary shaft or portion of the actuator 110 or spindle assembly 102 to seal the opening and form the damper for the respective drive component. As shown in FIGS. 7-8, a thin adhesive seal 190 is secured to an outer surface 190 of the cover proximate to opening 182.

Figure 9:
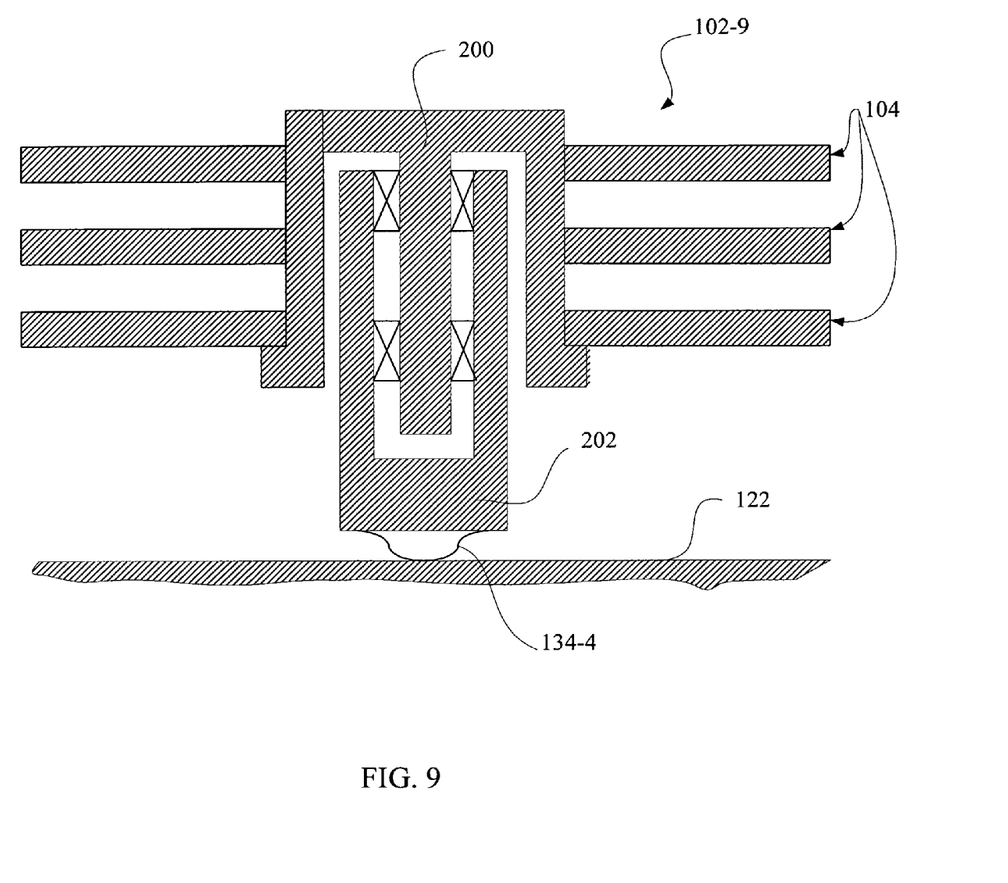
FIG. 9 schematically illustrates an embodiment of a disc spindle assembly including a rotating shaft and an elastomeric damper.

FIG. 9 illustrates an embodiment of a spindle assembly 102-9 for discs including a rotating shaft 200 which rotates relative to stationary portion 202 via operation of a spindle motor (not shown). As shown, an elastomeric damper 134-4 is interposed between the stationary portion 202 of the spindle assembly and the base 122 or housing of the data storage device to damp vibration and limit vibration transmission. The damper is fabricated in place as previously described proximate to an interior portion of the base 122 spaced from the deck or perimeter portion of the base 122. Alternately, the damper 134-4 can be formed to the stationary portion of the spindle assembly.

Figure 10:
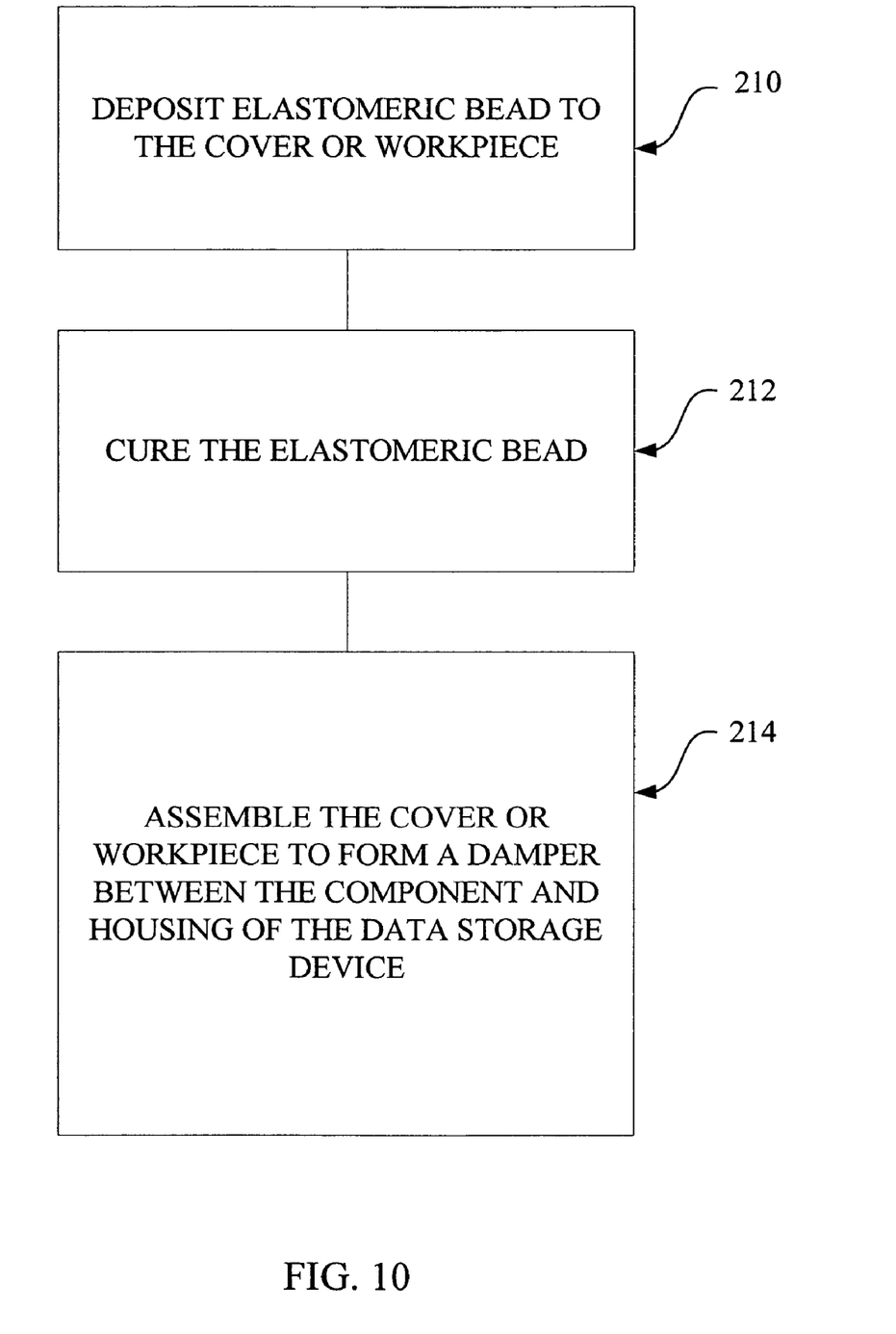
FIG. 10 is a flow chart illustrating an embodiment of fabrication steps for a formed in place elastomeric damper.

FIG. 10 schematically illustrates method steps for fabricating a formed in place damper as described with respect to previous embodiments. As described, an elastomeric bead is deposited to the cover or alternative workpiece as illustrated by block 210. The elastomeric bead is cured, for example, by heating the cover or bead for about 1-2 hrs at an elevated temperature to form the damper body as illustrated by block 212. Thereafter, the cover or workpiece is assembled to the data storage device to form a damper interposed for example, between a stationary shaft or portion of the disc spindle assembly or actuator and the cover or housing or alternately interposed between a voice coil motor 118 and the housing or cover of the data storage device to damp vibration as illustrated by block 214.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. In the illustrative FIGS., the size and dimensions of various components or features may be exaggerated for clarity and it should be understood that the illustrated features are not necessarily drawn to scale. For example, the particular elements may vary depending on the particular application while maintaining substantially the same functionality without departing from the scope and spirit of the present invention. In addition, although the preferred embodiment described herein is directed to a magnetic data storage device, it will be appreciated by those skilled in the art that the teachings of the present invention can be applied to other housing enclosing rotating components or components generating vibration without departing from the scope and spirit of the present invention. Also application of the present invention is not limited to features of a particular illustrated embodiment and can include features of different embodiments.

What is claimed is:

1. A damping assembly for a data storage device including a rotating assembly having a rotating portion rotatable about a stationary portion and comprising:
   a cover plate including an inner surface and an outer surface and having a perimeter portion about an interior portion and the perimeter portion is assembled to a base to form an enclosed compartment of the data storage device; and
   a formed in place damper formed of an elastomeric bead cured to the interior portion of the cover plate proximate to the stationary portion of the rotating assembly to form a damper body having a rounded body contour formed by an outer surface of the cured elastomeric bead and configured to interface with a concave surface of the stationary portion of the rotating assembly.

2. The damping assembly of claim 1 wherein the elastomeric bead is thermally cured to the cover plate.

3. The damping assembly of claim 1 wherein the rotating assembly is a disc spindle assembly or actuator assembly.

4. The damping assembly of claim 1 wherein the formed in place damper includes a first portion having a surface coextending along a portion of a lower surface of the cover, a second portion having a surface coextending along a portion of an upper surface of the cover and a third portion extending through an opening in the cover.

5. The damping assembly of claim 1 wherein the elastomeric bead is formed of a composite material including an epoxy elastomeric material and a curative or accelerator material.

6. The damping assembly of claim 1 wherein the cured elastomeric bead forms a bulbous body shape for the damper body having a rounded surface spaced from an inner surface of the cover plate.

7. The damping assembly of claim 1 wherein the cover plate includes a plurality of elastomeric beads cured to the cover plate to form a plurality of spaced formed in place dampers.

8. The damping assembly of claim 1 wherein the cover plate includes a socket and the elastomeric bead is cured in the socket to form the damper body protruding from the socket.

9. The damping assembly of claim 1 wherein the cover plate includes an opening and the damper body extends through the opening to form a seal for the opening.

10. The damping assembly of claim 1 wherein the formed in place damper includes a first portion extending through an opening in the cover and a second portion having a surface coextending along a surface of the cover traverse to the opening.

11. An interface for a disc spindle assembly rotationally supporting at least one disc or an actuator assembly rotationally supporting at least one head to read data from or write data to the at least one disc wherein the interface comprises;
    an elastomeric body formed in place of an elastomeric bead cured to one of the disc spindle assembly, the actuator assembly, an interior portion of a cover or base proximate to a stationary portion of the disc spindle assembly or the interior portion of the cover or the base proximate to a stationary portion of the actuator assembly and the elastomeric body configured to produce a body contour formed by an outer surface of the cured elastomeric bead to form the interface for the stationary portion of the disc spindle assembly or the stationary portion of the actuator assembly relative to the cover or the base.

12. The damper of claim 11 wherein the elastomeric bead is cured to the stationary portion of the disc spindle assembly or the stationary portion of the actuator assembly to form the interface integral to the stationary portion of the disc spindle assembly or integral to the stationary portion of the actuator assembly.

13. A method for fabricating the interface of claim 11 comprising the steps of:
    depositing the curable elastomeric bead to the cover, the base, the stationary portion of the disc spindle assembly or the stationary portion of the actuator assembly;

curing the elastomeric bead to form the elastomeric body protruding from the cover, the base, the stationary portion of the disc spindle assembly, or the stationary portion of the actuator assembly; and assembling the cover to the base so that the elastomeric body is disposed between one of the stationary portion of the disc spindle assembly or the stationary portion of the actuator assembly and one of the cover or the base to form the interface.

14. The method of claim 13 wherein the step of curing comprising; heating the elastomeric bead to cure the elastomeric bead.

15. The method of claim 13 wherein the elastomeric bead is deposited on the cover and the cover is heated to cure the elastomeric bead to form the interface.

16. The method of claim 13 wherein the elastomeric bead is deposited on the cover to form a bulbous body shape protruding from an inner surface of the cover having a rounded surface spaced from the inner surface of the cover.

17. The method of claim 16 wherein the cover is assembled so that the elastomeric body is disposed in a concave surface of the stationary portion of the disc spindle assembly or the stationary portion of the actuator assembly.

18. The interface of claim 11 wherein the elastomeric bead is a composite material.

19. A damper assembly comprising a damper body formed of an elastomeric bead cured to one of a stationary portion of a disc spindle assembly supporting at least one disc, a stationary portion of an actuator assembly rotationally supporting at least one head to read data from or write data to the at least one disc, an interior portion of a cover or base proximate to the stationary portion of the disc spindle assembly, or the interior portion of the cover or the base proximate to the stationary portion of the actuator assembly wherein the damper body has a bulbous body shape and rounded surface formed by an outer surface of the cured elastomeric bead.

20. The damper assembly of claim 19 wherein the elastomeric bead is formed on the cover and interfaces with a concave surface of the stationary portion of the disc spindle assembly or the stationary portion of the actuator assembly.

21. The damper of claim 19 wherein the damper forms a screwless interface between the disc spindle assembly or the actuator assembly and the cover or the base.

22. An assembly comprising:

an upright support structure member defining a first attachment feature adjacent a first surface at a distal end thereof;

a cover defining a second attachment feature adjacent a second surface operably opposing the first surface and spatially disposed therefrom forming a continuous gap therebetween to prevent the first and second surfaces from contacting each other; and a formed in place damping attachment member constructed of an elastomeric bead cured to one of the first and second attachment features and configured to matingly engage the other of the first and second attachment features and to fill at least a portion of the gap between the first and second surfaces.

23. The assembly of claim 22 wherein the second attachment feature is characterized as a socket.

24. The assembly of claim 22 wherein the second attachment feature is characterized as an aperture.

25. The assembly of claim 22 wherein the first attachment feature is characterized as a socket.

26. The assembly of claim 22 wherein the upright support structure is one of a stationary spindle shaft or portion and a stationary actuator shaft or portion.

* * * * *